Figure 1:
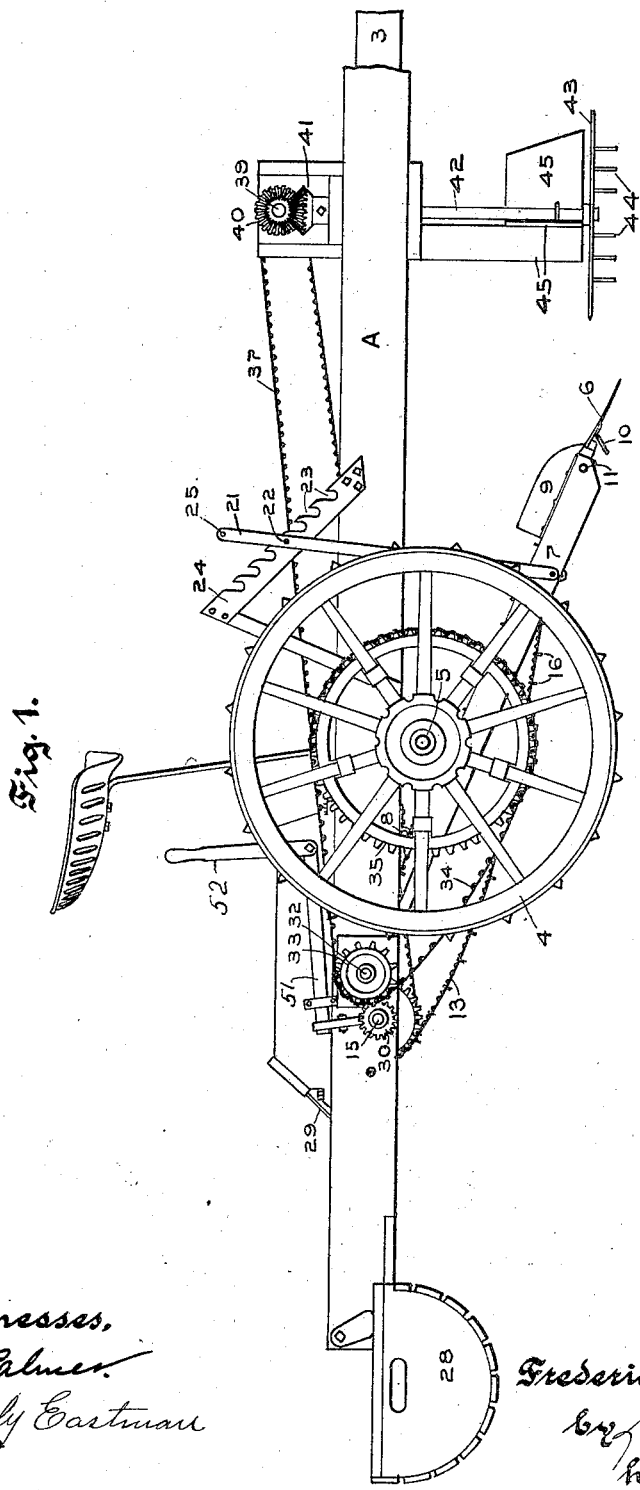

No. 726,428. PATENTED APR. 28, 1903.
F. HEINRICH.
POTATO DIGGER.
APPLICATION FILED APR. 26, 1902.
NO MODEL. 3 SHEETS—SHEET 1.

Witnesses,
W. H. Palmer
Emily Eastman

Inventor
Frederick Heinrich.
by Lothrop & Johnson
his Attorneys

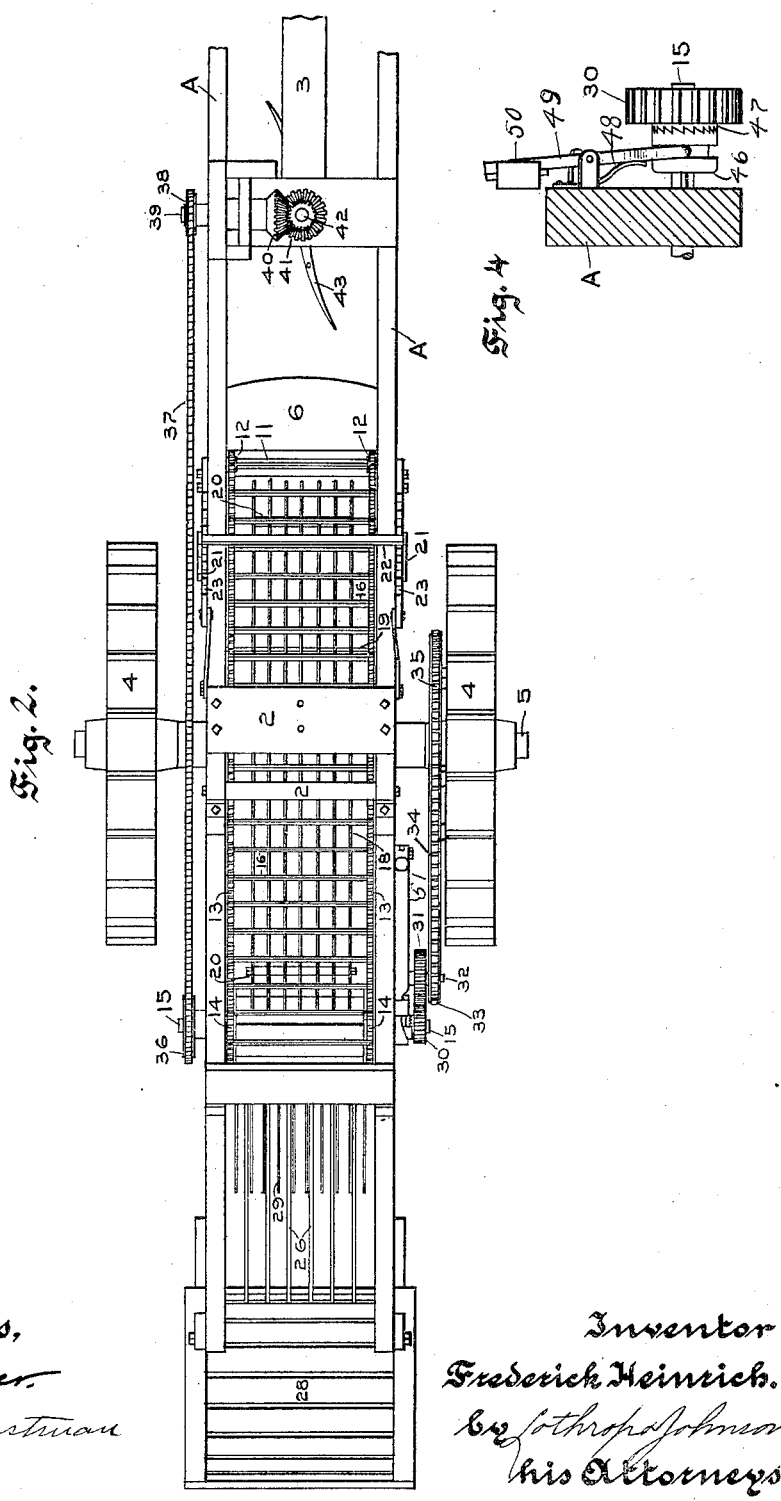

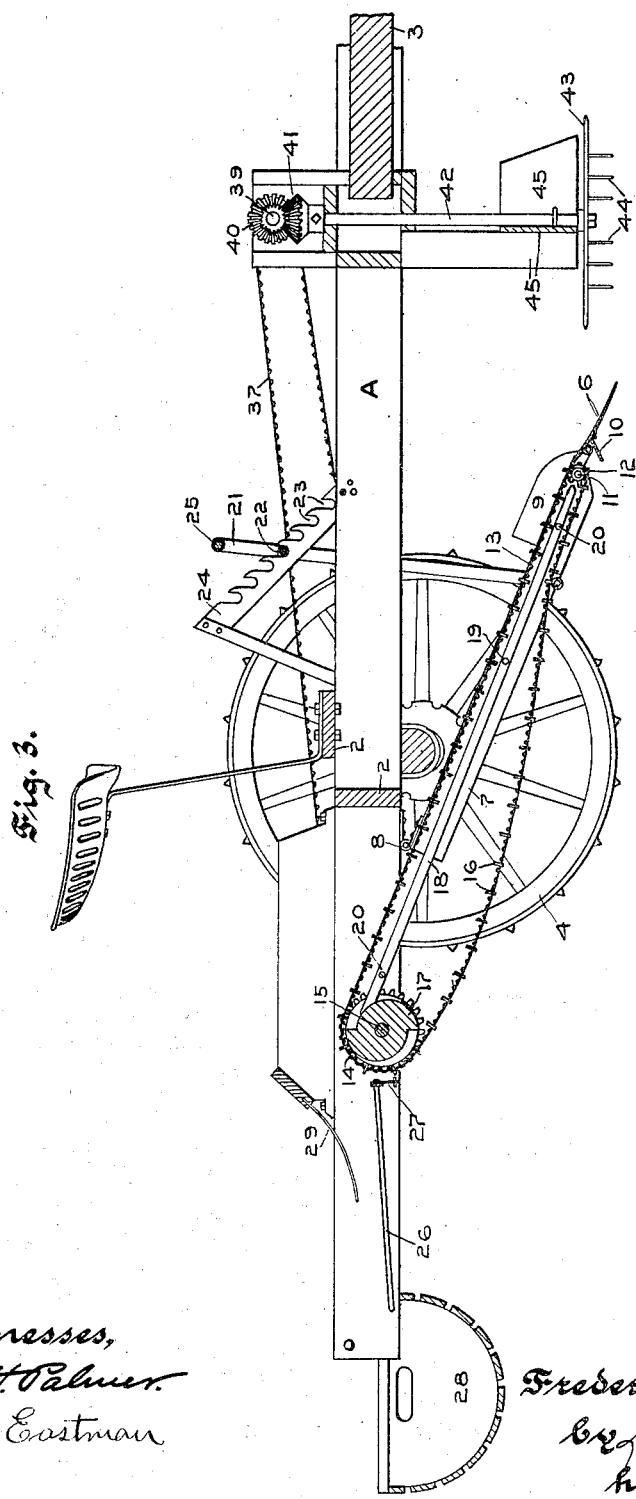

UNITED STATES PATENT OFFICE.

FREDERICK HEINRICH, OF RUSH CITY, MINNESOTA.

POTATO-DIGGER.

SPECIFICATION forming part of Letters Patent No. 726,428, dated April 28, 1903.

Application filed April 26, 1902. Serial No. 104,738. (No model.)

*To all whom it may concern:*

Be it known that I, FREDERICK HEINRICH, a citizen of the United States, residing at Rush City, in the county of Chisago and State of Minnesota, have invented certain new and useful Improvements in Potato-Diggers, of which the following is a specification.

My invention relates to improvements in potato-diggers; and it consists in providing means for digging the potatoes and conveying them to a suitable receptacle and in connection therewith means for removing the dirt from the potatoes and for removing the weeds and plants from in front of the plow.

My invention further consists in the features of construction and combination hereinafter more particularly described and claimed.

In the accompanying drawings, forming part of this specification, Figure 1 is a side elevation of my improved potato-digger. Fig. 2 is a top view. Fig. 3 is a longitudinal section, and Fig. 4 is a view of clutch mechanism forming part of my invention.

In the drawings, A represents the side bars of the frame, connected by cross-bars 2 and provided with a suitable pole 3.

4 represents carrying-wheels mounted upon the transverse shaft 5, journaled in the side bars of the frame. A plowshare 6 is secured to the lower ends of the bars 7, which have hinge connection 8 at their upper ends with the side bars A of the framework. The plowshare is provided with rearwardly-extending side guards 9 and with a downwardly-projecting underneath guard 10. Mounted in the lower ends of the bars 7 is a shaft 11, carrying at its ends sprocket-wheels 12, over which run the sprocket-chains 13, the upper ends of the sprocket-chains running over sprockets 14, mounted upon the shaft 15, journaled in the side bars A. The sprocket-chains 13 are connected by cross-bars 16, the whole constituting the elevator for the potatoes. Secured upon the shaft 15 is a double cam-drum 17, against the face of which abut the upper ends of the grate-bars 18, said bars having pivotal support in the side bars 7 by means of the shaft 19. The bars 18 are connected by rods 20. As the shaft 15 rotates, the cam 17 will reciprocate the upper ends of the bars 18, striking the elevator-chain and shaking the dirt from the potatoes. The lower end of the framework for the plowshare is supported by the uprights 21, connected by a cross-bar 22, adapted to fit into notches 23 of the bars 24, supported by the side bars of the framework, as shown in Fig. 1. By supporting the cross-bar 22 in different ones of the notches the plowshare can be held in adjusted positions. The uprights 21 are connected above the cross-bar 22 by a cross-bar 25, constituting a handle. From the elevator-chains the potatoes pass onto the grate-bars 26, said bars having spring-support 27, which will allow vibration of the bars to shake the small potatoes through the bars and carry the large potatoes into the receptacle 28. Downwardly-projecting fingers 29 are supported above the grate 26 to guide the potatoes from the elevator to the grate.

The shaft 15 is actuated to operate the chain elevator by means of a pinion 30, loosely mounted upon one end of said shaft and engaging with a gear 31, mounted upon the secondary shaft 32, said secondary shaft carrying a sprocket 33, connected by a chain 34 with a sprocket-wheel 35, carried by the adjacent drive-wheel. Upon the opposite end of the shaft 15 is mounted a sprocket-wheel 36, connected by a chain 37 with a sprocket 38, mounted upon the horizontal shaft 39, journaled in the forward end of the machine. Upon the inner end of the shaft 39 is mounted a beveled gear 40, intermeshing with a beveled gear 41, mounted upon the upper end of the vertical shaft 42. Upon the lower end of the vertical shaft 42 is secured an oppositely-curved knife 43, carrying downwardly-projecting prongs 44. Secured to the shaft 42, above the knife 43, are the wings 45.

In order operatively to connect the pinion 30 and shaft 15, I provide a clutch member 46, slidable upon the shaft 15 and adapted to be held out of engagement with the clutch member 47, carried by the pinion 30, by means of a spring 48 engaging with the clutch-actuating lever 49. A wedge-shaped block 50 engages with the upper end of the lever 49 and is connected by a link 51 with the hand-lever 52. By throwing the hand-lever 52 in one direction the block 50 is carried against the upper end of the clutch-lever to actuate the same and throw the clutch members out of engagement. When the hand-lever is thrown in the opposite direction, the clutch-lever will be released, allowing the spring 48 to carry the clutch members into engagement, as shown in Fig. 4.

In the operation of the machine the knife 43, with its downwardly-projecting fingers, will cut and remove the weeds from in front of the plowshare, the wings 45 preventing the weeds winding around the shaft 42. The potatoes as they are dug by the plowshare will be carried by the elevator-chains to the grate 26, passing from the grate 26 to the receptacle 28, the small and unmarketable potatoes dropping through the grate. While the potatoes are being lifted the shaker-bars 18 will be actuated by the drum 17 to strike the elevator-chain and shake the dirt from the potatoes. By means of the uprights 21 the plowshare can be vertically adjusted to vary the depth of cut or to lift the plowshare entirely from the ground. The downwardly-projecting flange 10, carried by the plowshare, will keep the dirt and rocks from coming in contact with the shaft and sprocket-wheels at the lower end of the elevator-chains.

I claim—

1. In a potato-digger of the class described, the combination with its endless carrier, of horizontal grate-bars at the rear of said carrier, and a spring-support for said bars at the end next to the carrier, the opposite ends of the bars being free.

2. In a potato-digger of the class described, the combination with the framework, a plowshare having hinge-support underneath said frame, and an endless carrier extending rearwardly from said share, of a grate having spring-support at the rear end of said carrier, and a series of downwardly and rearwardly extending fingers supported above said grate.

3. In a potato-digger of the class described, the combination with its framework and endless carrier, of a horizontal grate having spring-support at the rear end of said carrier, and downwardly and rearwardly extending spring-fingers supported above said grate.

In testimony whereof I affix my signature in presence of two witnesses.

FREDERICK HEINRICH.

Witnesses:
JOHN J. MULLEN,
P. M. CONOBOY.